US010242350B2

(12) United States Patent
Zhao

(10) Patent No.: US 10,242,350 B2
(45) Date of Patent: *Mar. 26, 2019

(54) MULTI-PLATFORM IN-APPLICATION PAYMENT SYSTEM

(71) Applicant: PAYPAL, INC., San Jose, CA (US)

(72) Inventor: Lucy Ma Zhao, Austin, TX (US)

(73) Assignee: PAYPAL, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/858,104

(22) Filed: Dec. 29, 2017

(65) Prior Publication Data

US 2018/0225641 A1     Aug. 9, 2018

Related U.S. Application Data

(63) Continuation of application No. 15/420,784, filed on Jan. 31, 2017, now Pat. No. 9,858,555, which is a continuation of application No. 13/774,736, filed on Feb. 22, 2013, now Pat. No. 9,558,478.

(51) Int. Cl.
  *G06Q 40/00*     (2012.01)
  *G06Q 20/10*     (2012.01)
  *G06Q 20/08*     (2012.01)
  *G06Q 20/32*     (2012.01)
  *G06Q 20/40*     (2012.01)

(52) U.S. Cl.
  CPC ............ *G06Q 20/10* (2013.01); *G06Q 20/08* (2013.01); *G06Q 20/3221* (2013.01); *G06Q 20/3223* (2013.01); *G06Q 20/405* (2013.01)

(58) Field of Classification Search
  CPC ...... G06Q 40/00; G06Q 20/10; G06Q 20/102; G06Q 20/40
  See application file for complete search history.

(56) References Cited

U.S. PATENT DOCUMENTS

| | | | |
|---|---|---|---|
| 8,224,709 | B2 | 7/2012 | Hirson |
| 8,392,274 | B2 | 3/2013 | Hirson |
| 8,543,087 | B2 | 9/2013 | Davis et al. |
| 8,645,226 | B1 | 2/2014 | Nguyen et al. |
| 9,558,478 | B2 | 1/2017 | Zhao |
| 9,858,555 | B2 | 1/2018 | Zhao |
| 2010/0312678 | A1 | 12/2010 | Davis et al. |
| 2011/0082772 | A1 | 4/2011 | Hirson |
| 2011/0125610 | A1 | 5/2011 | Goodsall et al. |

(Continued)

*Primary Examiner* — Lalita M Hamilton
(74) *Attorney, Agent, or Firm* — Haynes and Boone, LLP

(57) ABSTRACT

Systems and methods for providing multi-platform, in-application payments include transferring funds, by a payment service provider device, from a funding source to a payment account in response to receiving a first fund transfer instruction from one of a first user device and a second user device over a network. The payment service provider device then associates the payment account with a first platform application in response to receiving a first association instruction from the first user device over the network, and associates the payment account with a second platform application in response to receiving a second association instruction along with the user account information from a second user device over the network. The payment service provider device will pay for each of a first in-application purchase associated with the first platform application and a second in-application purchase associated with the second platform application using the payment account.

20 Claims, 11 Drawing Sheets

(56) References Cited

U.S. PATENT DOCUMENTS

2012/0130853 A1    5/2012   Petri et al.
2012/0233027 A1    9/2012   Hirson
2012/0265604 A1   10/2012   Corner et al.
2012/0276870 A1   11/2012   Davis et al.

MULTI-PLATFORM IN-APPLICATION PAYMENT SYSTEM

CROSS-REFERENCE TO RELATED APPLICATIONS

This is a Continuation application to U.S. Utility application Ser. No. 15/420,784 filed Jan. 31, 2017, entitled "MULTI-PLATFORM IN-APPLICATION PAYMENT SYSTEM," which in turn is a Continuation application to U.S. Utility application Ser. No. 13/774,736 filed Feb. 22, 2013, entitled "MULTI-PLATFORM IN-APPLICATION PAYMENT SYSTEM," now U.S. Pat. No. 9,558,478, issued Jan. 31, 2017, the disclosure of which is incorporated herein by reference in its entirety.

BACKGROUND

Field of the Invention

The present invention generally relates to online and/or mobile payments and more particularly to a multi-platform, in-application payment system and method for making online and/or mobile payments.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

One popular form of online and mobile purchases are in-application purchases. Applications such as, for example, gaming applications, social networking applications, and/or a variety of other applications known in the art, may allow a user to make purchases within the application for gaming currency, communications, application access, and/or a variety of other in-application items or actions known in the art. These purchases are typically preceded by the association by the user of a funding source (e.g., a credit card) with the application, such that when an in-application purchase is made in that application, that funding source may be charged the amount of the purchase. However, such application-purchase systems are inconvenient for the user, as the user must provide the funding source for each application with which the user wishes to make in-application purchases.

Application platforms such as, for example, the App Store® provided by Apple®, Google Play® provided by Google®, and the Windows Store® provided by Microsoft, have attempted to make in-application purchases easier by allowing a user of their application platform to create an application platform account and associate a funding source with that application platform account. The user may then provide their application platform account credentials (e.g., an identification and password) to any application operating on the application platform each time an in-application purchase is made to have that in-application purchase charged to the funding account associated with the application platform account. However, many users either have a plurality of different types of devices that provide different application platforms, or otherwise pay for purchases made from devices that provide different application platforms. In such situations, the user must then create an application platform account and provide a funding source for each application platform.

Furthermore, tracking in-application purchases may raise issues whether using a per-application funding source or a per-application platform funding source. For example, if different funding sources are used across applications or application platforms, the user may have trouble compiling in-application purchases made using the different funding sources in order to track their in-application spending behavior. Furthermore, those funding sources will typically allow the user to spend more on in-application purchases than the user would otherwise desire.

Thus, there is a need for an improved in-application payment system

Figure 1:
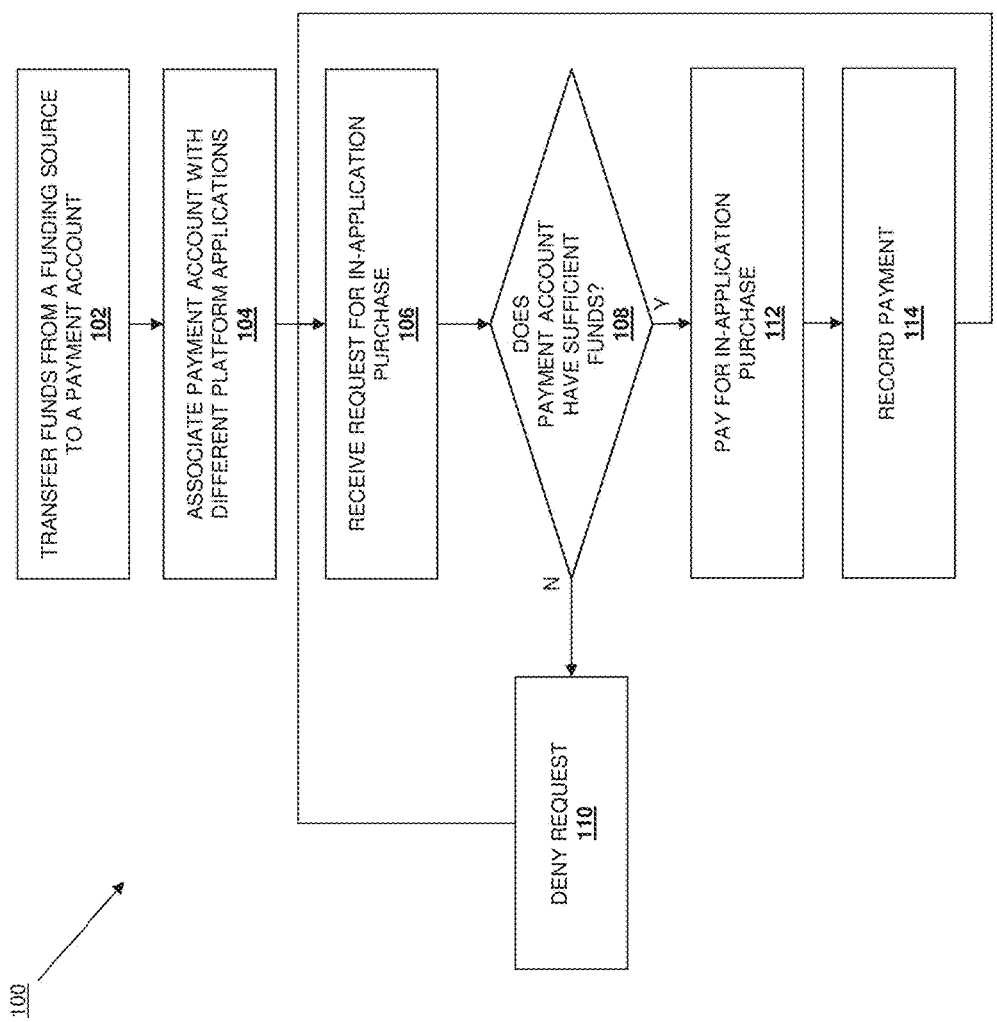
FIG. 1 is a flow chart illustrating an embodiment of a method for multi-platform, in-application payments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for multi-platform, in-application payments. As is known in the art, computer systems (such as the user devices discussed below) typically provide a hardware architecture and a software framework as an application platform to run applications. For example, Apple®-based computer systems (e.g., mobile devices that run the iOS operating system) provide an application platform to run applications that are available from the App Store® provided by Apple®, Android®-based computer systems (e.g., mobile devices that run the Android® operating system) provide an application platform to run applications that are available from Google Play® provided by Google®, Windows® computer systems (e.g., mobile devices that run the Windows® operating system) provide an application platform to run applications that are available from the Windows Store® provided by Microsoft, and so on. A user may add applications to a user device that provides the appropriate application platform, and those applications will then allow the user to make purchases for items or actions in the application while running the application (i.e., "in-application" purchases.)

The systems and methods of the present disclosure simplify payments for in-application purchases for items or actions in applications operating in multiple different platforms by funding a payment account from a funding source and then associating that payment source with a plurality of different applications operating on different application platforms via different user devices. For example, a user may use a first user device that provides a first application platform to associate the payment account with a first application, and that user may use a second user device that provides a second application platform to associate the payment account with a second application. Subsequent to these associations, any in-application purchases in the different applications may be quickly and easily paid for using the single payment account, regardless of the application platform that application is operating on.

Furthermore, the payment account (or multiple payment accounts) may be designated as different "budget" payment accounts in order to allow the user to associate each budget account with different types of in-application spending. For example, a gaming budget payment account may be associated with gaming applications that may operate on different application platforms, and thus all in-application spending related to gaming applications may be paid for using the gaming budget payment account, regardless of the application platform upon which those gaming applications operate. In some embodiments, budget payment accounts may be provided limited funds so that in-application spending using those budget payment accounts may be limited or controlled by the user (e.g., when the funds in the budget payment account have been used up, further in-application purchase requests will be denied.)

The multi-platform, in-application payment system allows the easy tracking of in-application purchases made in different applications operating across a plurality of application platforms, and the systems and methods discussed herein may provide for reporting any in-application purchases that are paid for using the payment account. For example, any in-application purchases made in different applications operating across different application platforms using the payment account (or budget payment accounts) may be recorded and reported to the user so that the user can quickly and easily determine spending habits with regard to their in-application purchases, regardless of which application platform those purchases are associated with.

Figure 2:
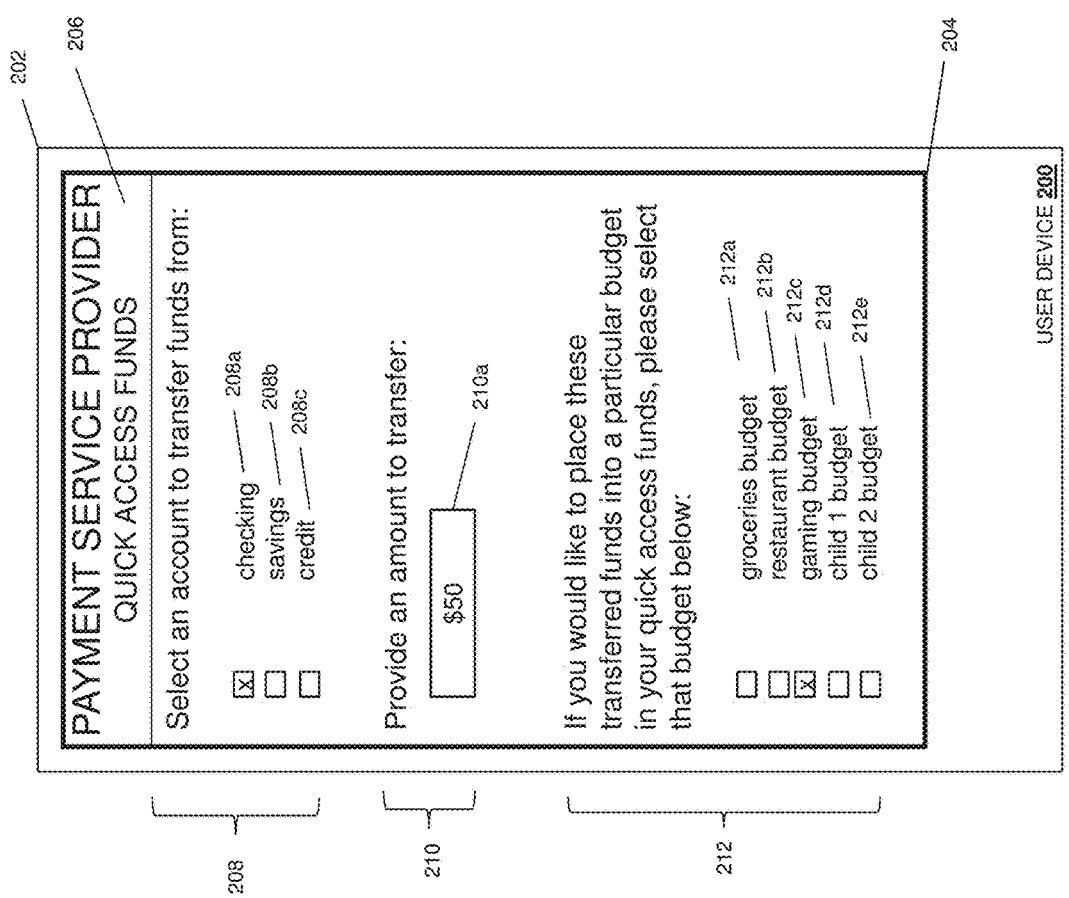
FIG. 2 is a front view illustrating an embodiment of a user device displaying a funding transfer screen.

Referring now to FIGS. 1 and 2, an embodiment of a method 100 for providing multi-platform, in-application payments is provided. In the discussion of the method 100 below, a system is provided that includes a user having a plurality of user devices, account providers that provide funding accounts to the user, and a payment service provider that provides a payment account for the user. The user may link and/or use the user devices, funding accounts, and payment account as discussed below. However, a wide variety of modification to the systems and methods discussed below is envisioned as falling within the scope of the present disclosure, including the system and method being provided and/or performed by an account provider or other system provider (rather than by the payment service provider as discussed below.)

The method 100 begins at block 102 where funds are transferred from a funding source to a payment account. In the embodiments discussed below, a user may have user accounts with one or more account providers and a user account with the payment service provider. For example, a user may have a checking account with a checking account provider, a savings account with a savings account provider, a credit account with a credit account provider, and/or a variety of other funding accounts offered by a variety of other funding account providers known in the art. The user also has a user account with a payment service provider such as, for example, PayPal, Inc. of San Jose, Calif., and the user may link any or all their funding accounts provided by the account providers with the user account provided by the payment service provider. Once linked to the user account provided by the payment service provider, a funding account may then be used to pay for purchases made by the user from application providers via the user account provided by the payment service provider. For example, the user may pay for a purchase from an application provider by providing user account information for the user account provided by the payment service provider, and the payment service provider will compete that purchase using funds from a designated funding account. However, in the systems and methods discussed below, the payment service provider provides the user with a payment account into which the user may transfer funds from a funding account, and then that payment account may be used to make payment to application providers.

Referring now to FIG. 2, an embodiment of a user device 200 is illustrated that includes a chassis 202 that houses a display device 204. The display device 204 is displaying a funding transfer screen 206 that may be provided by the payment service provider during block 102 of the method 100. For example, the user may use the user device 200 to connect to a payment service provider device over a network (e.g., the Internet), and then user the user device 200 to provide user account information (e.g., a user name, account number, password, etc.) to the payment service provider device to access the user account provided by the payment service provider. In response to verifying the user account using the user account information, the payment service provider device may provide the funding transfer screen 206 over the network to the user device 200.

The embodiment of the funding transfer screen 206 in FIG. 2 includes a funding account section 208, a transfer amount section 210, and a payment account section 212. The funding account section 208 includes a plurality of funding accounts 208a, 208b, and 208c that the user may have previously associated with the user account provided by the payment service provider, as discussed above. The transfer amount section 210 includes an input box 210a in which the user may provide an amount to transfer from a selected funding account in the funding account section 208 to a selected payment account in the payment account section 212. The payment account section 212 includes a plurality of payment accounts 212a, 212b, 212c, 212d, and 212e that are budget payment accounts that the user may have previously set up in association with the user account provided by the payment service provider. In the example provided in the illustrated embodiment, the user has set up budget payment accounts for a groceries budget payment account 212a, a restaurant budget payment account 212b, a gaming budget payment account 212c, a child 1 budget payment account 212*d*, and a child 2 budget payment account 212*e*. As discussed below, the payment accounts 212*a-e* allow the user control over the spending in any particular budget category by limiting the amount of funds in that payment account such that payment will be denied for any purchases requested using that payment account when that payment account does not include the funds to satisfy that purchase request.

While a specific example of a funding transfer screen 206 has been provided, a wide variety of modifications and additions will fall within the scope of the present disclosure. For example, other funding accounts known in the art may be associated with the user account provided by the payment service provider and thus provided in the funding account section 208 for selection by the user. In another example, the transfer amount section 210 may provide options for reoccurring, automatic fund transfers such as, for example, options that allow the user to have funds (e.g., a predetermined amount or varying amount) transferred from a selected funding account to a selected payment account at a selected time of the week, month, year, etc. In another example, rather than the plurality of payment accounts 212*a-e*, a single payment account may be provided by the payment service provider to the user such as, for example, a PayPal Bucks® account available from PayPal Inc, of San Jose, Calif.

Thus, in the illustrated embodiment of block 102, the user has used the funding transfer screen 206 on the user device 200 to provide an instruction to the payment service provider to transfer $50 from the checking account 208*a* to the gaming budget payment account 212*c*. That funding transfer request may then be transmitted from the user device 200 (e.g., in response to selecting a send button, not illustrated) over the network to the payment service provider device. In response to receiving the funding transfer instruction, the payment service provider device then sends an instruction over the network to the account provider device that provides the funding account selected in the funding transfer instruction, and that instruction causes the account provider device to transfer the funds requested in the funding transfer instruction to the payment service provider device. Upon receiving the funds from the account provider device, the payment service provider device may transfer or otherwise credit the payment account (e.g., the gaming budget payment account) provided in the funding transfer instruction with the transferred funds. In different embodiments, block 102 of the method 100 may be performed to make several funds transfers to one or more payments accounts, either at the same time or at different times.

Figure 3:
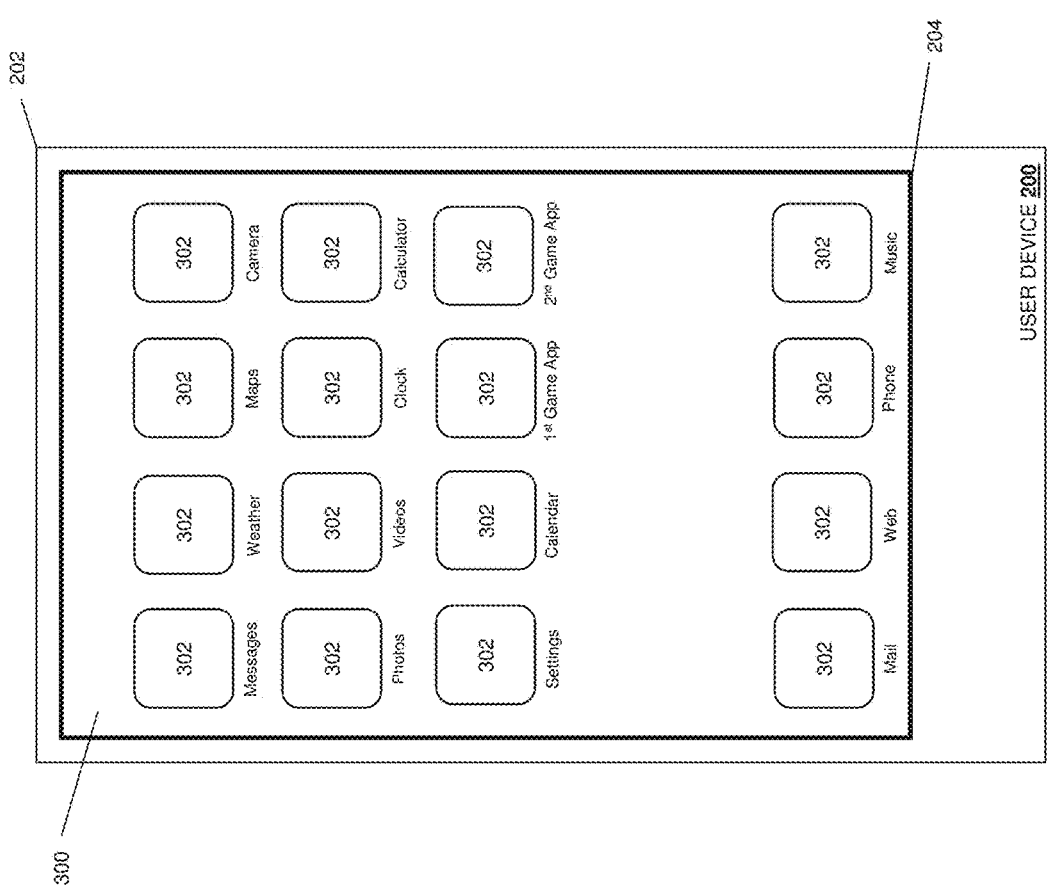
FIG. 3 is a front view illustrating an embodiment of a user device displaying an application home screen.
Figure 4:
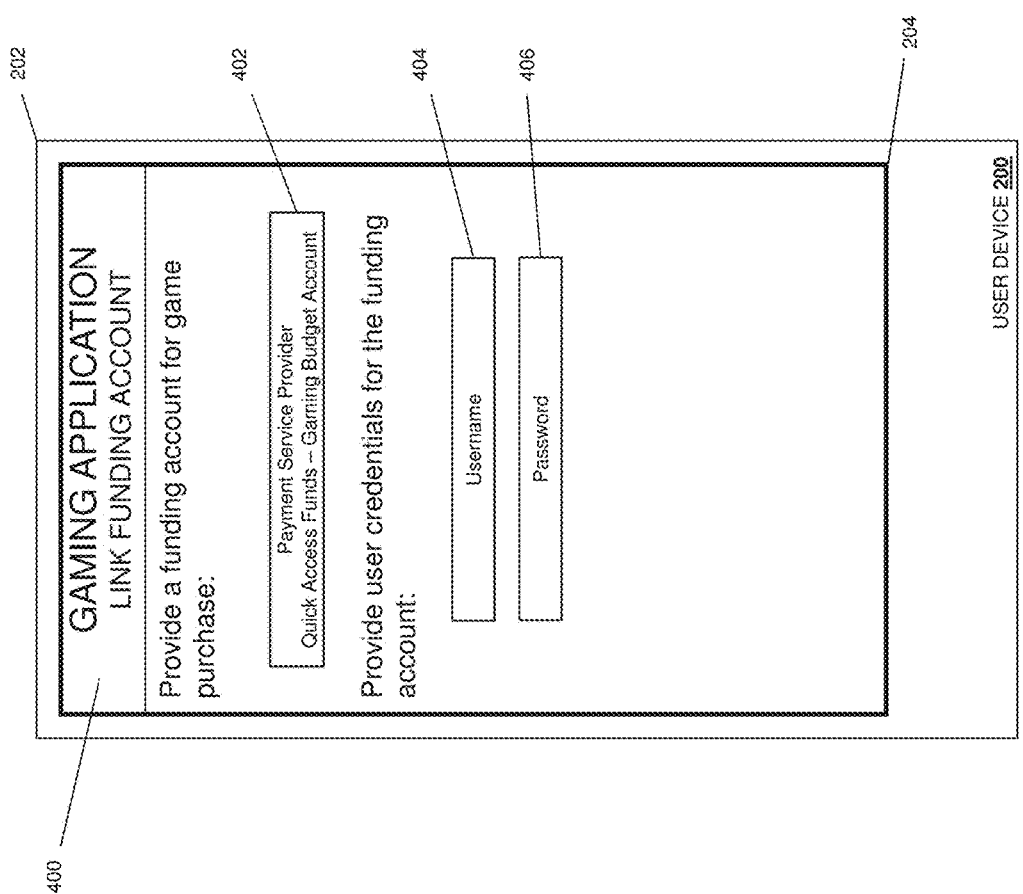
FIG. 4 is a front view illustrating an embodiment of a user device displaying an application-payment account linking screen.

Referring now to FIGS. 1, 3, and 4, the method 100 then proceeds to block 104 where the payment account is associated with applications operating on different platforms. FIG. 3 illustrates the user device 200 displaying on its display device 204 an embodiment of an application home screen 300 that includes a plurality of application icons 302. As discussed above, the user device 200 may provide an application platform for running applications, and thus each of the application icons 302 may be associated with an application that runs on a particular application platform. Thus, each of the application icons 302 is associated with an application that operates on the application platform provided by the user device 200. As can be seen, different types of applications may be accessed through the application icons 302 included on the application home screen 300, including but not limited to a messaging application, a weather application, a map application, a camera application, a photo application, a video application, a clock application, a calculator application, a settings application, a calendar application, gaming applications, a mail application, a web application, a phone application, and a music application.

Furthermore, the user may at least one other user device that is substantially the same as the user device 200 but that provides a different application platform than the application platform provided by the user device 200. For example, the user device 200 may provide a mobile device available from Apple® that includes an application platform to run applications that are available from the App Store® provided by Apple®, while the at least one other user device of the user may be an Android® mobile device that includes an application platform to run applications that are available from Google Play® provided by Google®. Furthermore, the user may be associated with other user devices through other users, and that user device may provide the same application platform as one of the user devices of the user, or a different application platform than the user devices of the user. For example, the user may provide a payment account for a user device used by a child of the user. While the embodiment discussed herein involves applications running on mobile devices, non-mobile devices (e.g., desktop computers) are envisioned as falling within the scope of the present disclosure.

At block 104 of the method 100, the user may use their user devices (or another user may use a user device associated with the user) to associate the payment account that was funded in block 102 of the method 100 with applications that operate on different application platforms. FIG. 4 illustrates an application-payment account linking screen 400 that may be accessed using an account function, a settings function, and/or other functions in an application. The illustrated embodiment of the application-payment account linking screen 400 includes a payment account input 402 and credential inputs 404 and 406, and the user may link the payment account funded in block 102 with an application by providing the payment account in the payment account input 402 along with the credential for that payment account in the credential inputs 404 and 406. While a specific example has been provided, one of skill in the art will recognize that a variety of different information may be provided by the user to link a payment account with an application while still remaining within the scope of the present disclosure.

For example, the user may have a first user device (e.g., the user device 200 illustrated in FIG. 3) that provides a first application platform, and at block 104 of the method 100, the user may select an application icon 302 on the application home screen 300 to open up an application. With that application open, the user may access an application-payment account linking screen 400 for that application and provide a first association instruction along with user account information for the user account (e.g., the payment account in the payment account input 402 and user account information in the credential inputs 404 and 406) provided by the payment service provider in order to associate the payment account with the application that operates on the first platform provided by the first user device.

Similarly, the user may have a second user device (substantially similar to the user device 200 illustrated in FIG. 3) that provides a second application platform, and at block 104 of the method 100, the user may select an application icon 302 on the application home screen 300 to open up an application. With that application open, the user may access an application-payment account linking screen 400 for that application and provide a second association instruction along with user account information for the user account (e.g., the payment account in the payment account input 402 and user account information in the credential inputs 404 and 406) provided by the payment service provider in order to associate the payment account with the application that operates on the second platform provided by the second user device. Further still, a child of the user may have a third user device (substantially similar to the user device 200 illustrated in FIG. 3) that provides an application platform that may be the first application platform, the second application platform, or a third application platform, and at block 104 of the method 100, the child of the user may select an application icon 302 on the application home screen 300 to open up an application. With that application open, the child may access an application-payment account linking screen 400 for that application and provide a third association instruction along with user account information for the user account (e.g., the payment account in the payment account input 402 and the user account information in the credential inputs 404 and 406) provided by the payment service provider in order to associate the payment account with the application that operates on the platform provided by the third user device. Thus, the payment account may be associated with a plurality of applications, with at least two of those applications operating on different application platforms.

Figure 5:
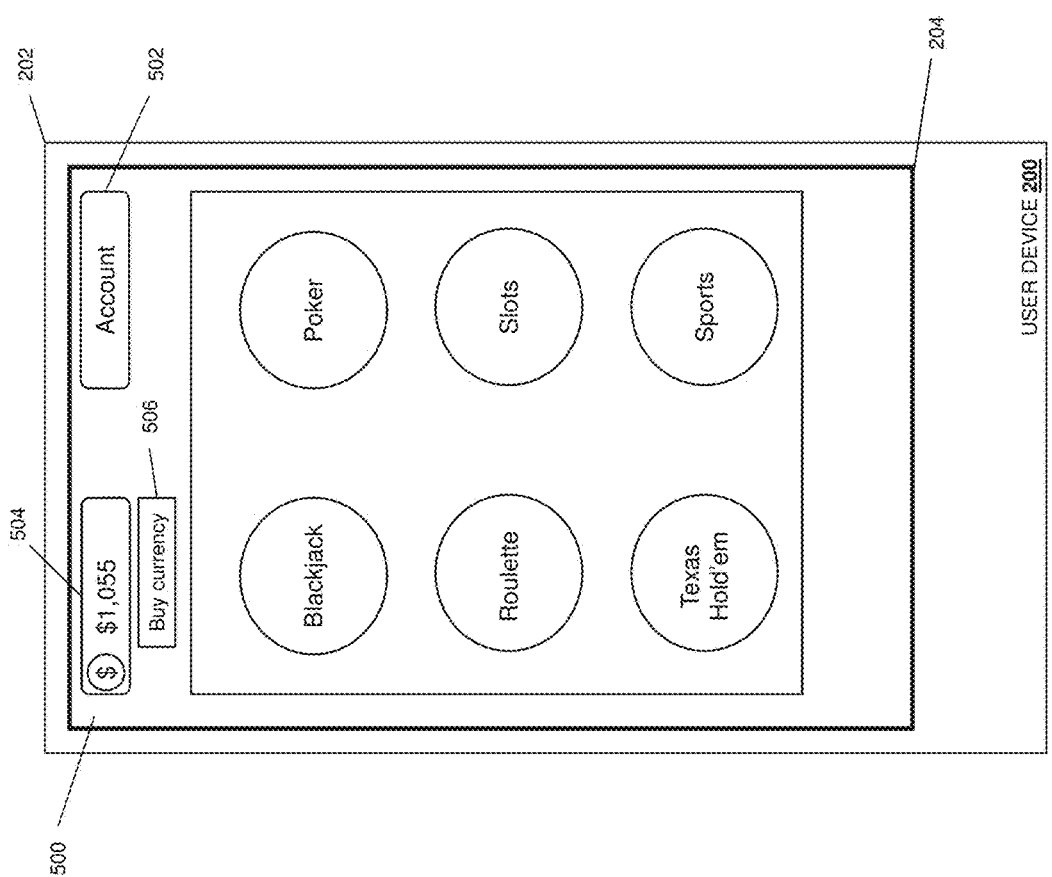
FIG. 5 is a front view illustrating an embodiment of a user device displaying a first in-application purchasing screen.
Figure 6:
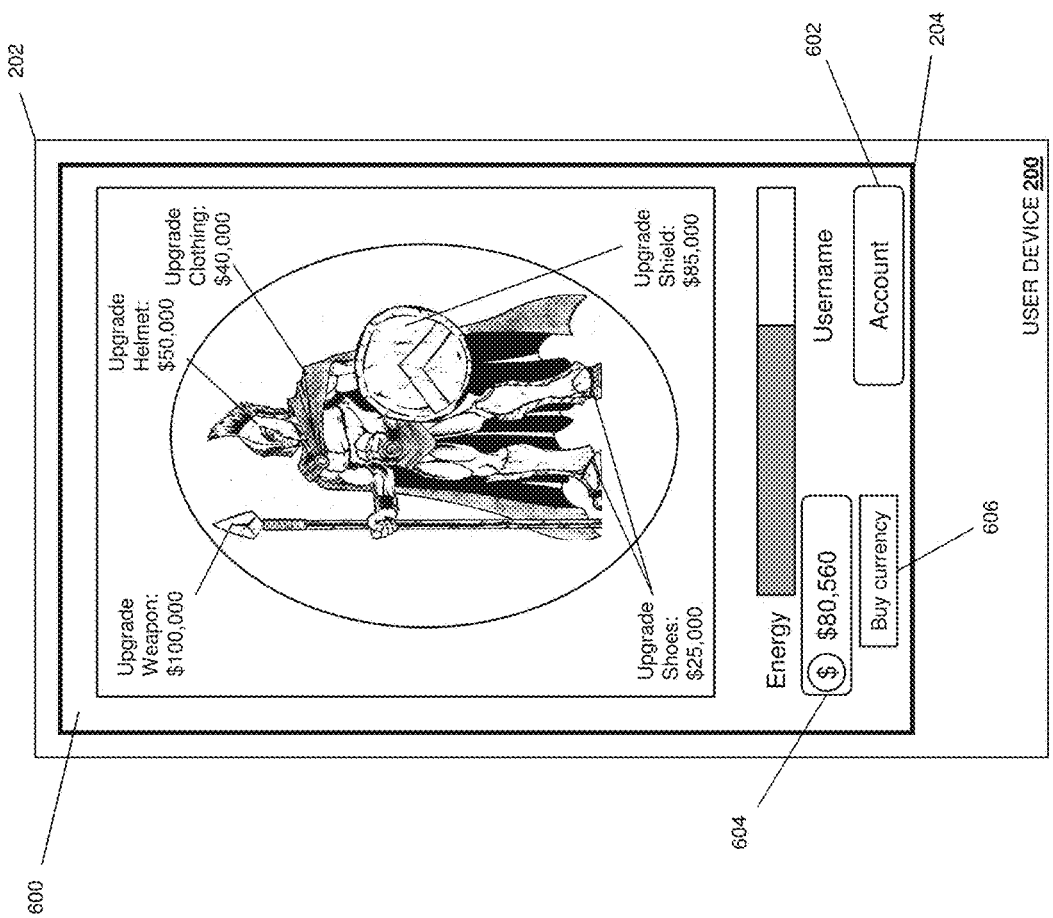
FIG. 6 is a front view illustrating an embodiment of a user device displaying a second in-application purchasing screen.

Referring now to FIGS. 1, 5, and 6, the method 100 then proceeds to block 106 where a request is received for an in-application purchase. FIG. 5 illustrates an embodiment of an in-application purchasing screen 500 provided by a gaming application that, in the illustrated embodiment, is a gambling gaming application. As is known in the art, the user may select an appropriate application icon 302 on the application home screen 300 of the user device 200, illustrated in FIG. 3, in order to open up the gaming application to be provided (or to navigate to) the in-application purchasing screen 500. The in-application purchasing screen 500 includes an account tab 502, a gaming currency indicator 504, and a buy currency button 506. In an embodiment, the account tab 502 may be selected by the user in order to access the application-payment account linking screen 400 that allows the user to associate the payment account with the application, as discussed above with reference to block 104. In another embodiment, the buy currency button 506 may be selected by the user to request an in-application purchase of game currency (i.e., to increase the amount of game currency in the game currency indicator 504, which one of skill in the art will recognize that the user may use to gamble in the gambling gaming application.) For example, the user may send an in-application purchase request over the network from the gaming application on the user device 200 illustrated in FIG. 5 by selecting the buy currency button 506 and providing information about that in-application purchase (e.g., a request to transfer $5 from the payment account to receive $1000 gaming currency.) In response, due to the previous association of the payment account with the application, the payment service provider device receives the in-application purchase request. In an embodiment, because of the previous association of the payment account and the application, the user is not required to enter an identification, password, or other credentials for the payment account.

FIG. 6 illustrates an embodiment of an in-application purchasing screen 600 provided by a gaming application that, in the illustrated embodiment, is a fantasy gaming application. As is known in the art, the user may select an appropriate application icon 302 on the application home screen 300 of the user device 200, illustrated in FIG. 3, in order to open up the gaming application to be provided (or to navigate to) the in-application purchasing screen 600. The in-application purchasing screen 600 includes an account tab 602, a gaming currency indicator 604, and a buy currency button 606. In an embodiment, the account tab 602 may be selected by the user in order to access the application-payment account linking screen 400 that allows the user to associate the payment account with the application, as discussed above with reference to block 104. In another embodiment, the buy currency button 606 may be selected by the user to request an in-application purchase of game currency (i.e., to increase the amount of game currency in the game currency indicator 604, which one of skill in the art will recognize that the user may use to upgrade their character in the fantasy gaming application.) For example, the user may send an in-application purchase request over the network from the gaming application on the user device 200 illustrated in FIG. 6 by selecting the buy currency button 606 and providing information about that in-application purchase (e.g., a request to transfer $10 from the payment account to receive $20,000 gaming currency.) In response, due to the previous association of the payment account with the application, the payment service provider device receives the in-application purchase request. In an embodiment, because of the previous association of the payment account and the application, the user is not required to enter an identification, password, or other credentials for the payment account.

Thus, at block 106, an in-application purchase request may be received by the payment service provider device from an application on a user device that provides a particular application platform, and that application platform may be any of a plurality of application platforms provided by different user devices belonging to or associated with the user and the payment account or accounts funded in block 102. For example, the user may have linked a gaming budget payment account with a gaming application operating on a first application platform, and at block 106 that user may request an in-application purchase in that gaming application. In another example, the user may have funded a child budget payment account at block 102, at block 104 a child of the user may have associated that child budget payment account with a gaming application operating on a second application platform, and at block 106 the child may have provided a request for an in-application purchase in that gaming application.

The method 100 then proceeds to decision block 108 where it is determined whether the payment account has sufficient funds for the in-application purchase request received at block 106. Upon receiving the in-application purchase request, the payment service provider device uses information in the request (e.g., a user name, payment account number, user account information and/or credentials, purchase amount, purchase type, etc.) to access a database including details of the payment account of the user that is associated with that application and thus associated with that in-application purchase request. The payment service provider device then compares the purchase amount in the in-application purchase request with the funds available in the payment account to determine whether the payment account has sufficient funds to satisfy the in-application purchase request. If, at decision block 108, it is determined that the payment account associated with the in-application purchase request does not have sufficient funds to satisfy the in-application purchase request, the method 100 proceeds to block 110 where the in-application purchase request is denied. In an embodiment, at block 110, the payment service provider device may send a request denial over the network to the user device 200 and/or an application provider device of the application provider in order to deny the in-application purchase request. Thus, a user may fund a payment account or budget account with a limited amount of funds such that once those funds are spent, further in-application purchases will be denied. Following the denial of the in-application purchase request, the method 100 may return to block 106 to receive in-application purchase requests. As discussed above, the funding of the payment account (described above with reference to block 102) may occur at different time during the method 100 such that an in-application purchase request received after a request denial at block 110 may be associated with a payment account that has sufficient funds to satisfy that in-application purchase request.

If, at decision block 108, it is determined that the payment account associated with the in-application purchase request has sufficient funds to satisfy the in-application purchase request, the method proceeds to block 112 where the in-application purchase is paid for. In an embodiment, if the payment service provider device determines at decision block 108 that the payment account includes sufficient funds to satisfy the in-application purchase request, the payment service provider device will transfer funds (e.g., the purchase amount in the in-application payment request) from the payment account to an account of the application provider. In response to that transfer, an application provider device of the application provider may credit the user, via the application designated in the in-application purchase request, with gaming currency or other purchasable items or actions available in the application.

Figure 7:
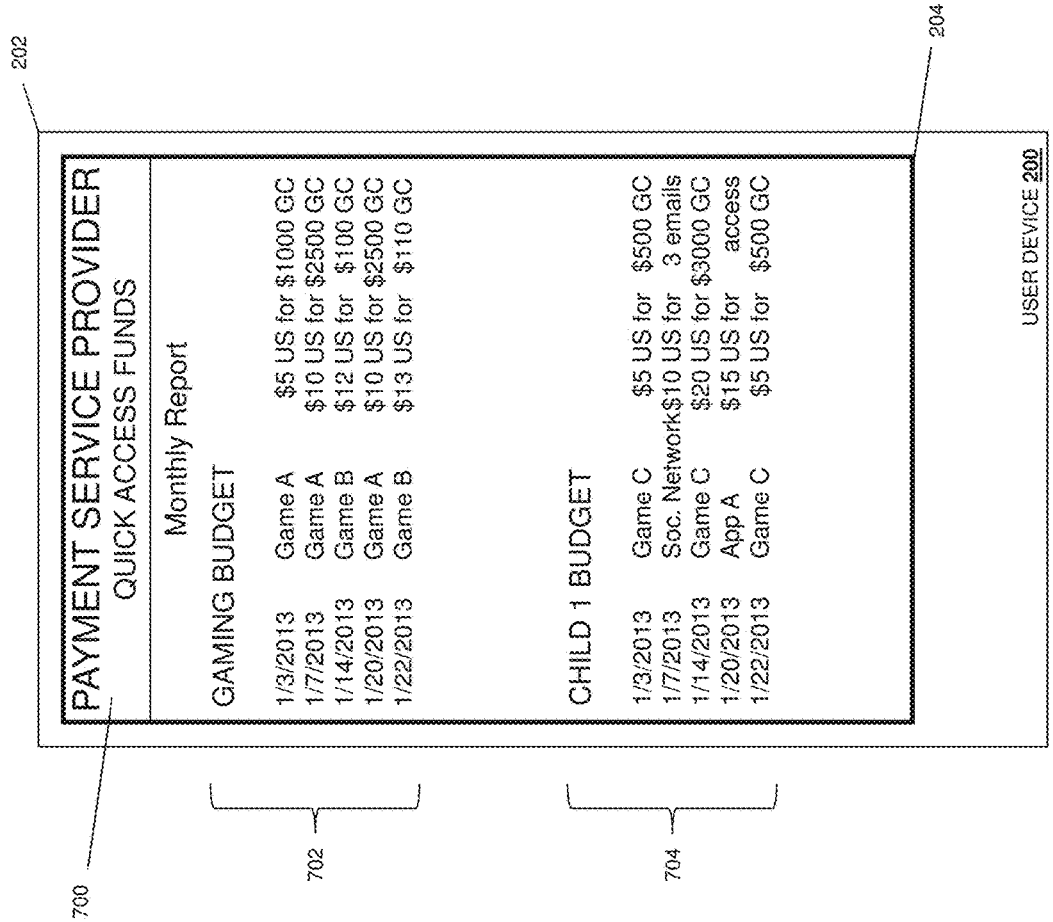
FIG. 7 is a front view illustrating an embodiment of a user device displaying a payment account reporting screen.

Referring now to FIGS. 1 and 7, the method 100 then proceeds to block 114 where the payment of the in-application purchase request is recorded. In an embodiment, the payment service provider device records the payment made at block 112 as an in-application purchase along with details associated with that in-application purchase such as, for example, the application, the application platform, the purchase amount, the date of the in-application purchase, a description of the in-application purchase, and/or a variety of other in-application purchase details known in the art. In an embodiment, reports may be sent (e.g., over the network from the payment service provider device to the user device) that detail in-application purchases made using a payment account or payment accounts. FIG. 7 illustrates an embodiment of a payment account reporting screen 700 that may be provided by the payment service provider device to the user device 200 periodically (e.g., weekly, monthly, etc.), on request, and/or a variety of other manners known in the art. The payment account reporting screen 700 includes a first payment account report 702 and a second payment account report 704. In the embodiment provided in FIG. 7, the first payment account report 702 is a report for a gaming budget payment account that the user may have associated with multiple gaming applications using different application platforms during the method 100, while the second payment account report 704 is a report for a child budget payment account that the user may have funded for a child followed by that child associating that payment account with multiple applications using different application platforms during the method 100.

The first payment account report 702 in the example of FIG. 7 includes, for each in-application purchase made by the user that was associated with the gaming budget payment account, a date, a gaming application indicator, a purchase amount, and a description of what was purchased (e.g., different amounts of gaming currency (GC)) are provided. The second payment account report 704 in the example of FIG. 7 includes, for each in-application purchase made by the child of the user and associated with the child budget payment account, a date, an application indicator, a purchase amount, and a description of what was purchased (e.g., different amounts of gaming currency (GC), social network emails, and application access) are provided. Thus, the user is provided reports of a variety of in-application spending using a payment account or different payment account that allows that user to track their spending of a particular type (e.g., on gaming applications in the example provided) or the spending of a child or other related person.

Thus, a system and method for multi-platform, in-application payments has been described that allows a user to associate a pool or pools of funds as payment account(s) that can be used across applications operating on different application platforms, and that may be provided to set limits on spending to manage types of purchases or purchases by associated users. Furthermore, reports may be issued for each payment account to allow the user to easily track and manage spending by one or more users and/or spending that is associated with applications that operate on different application platforms.

Figure 8:
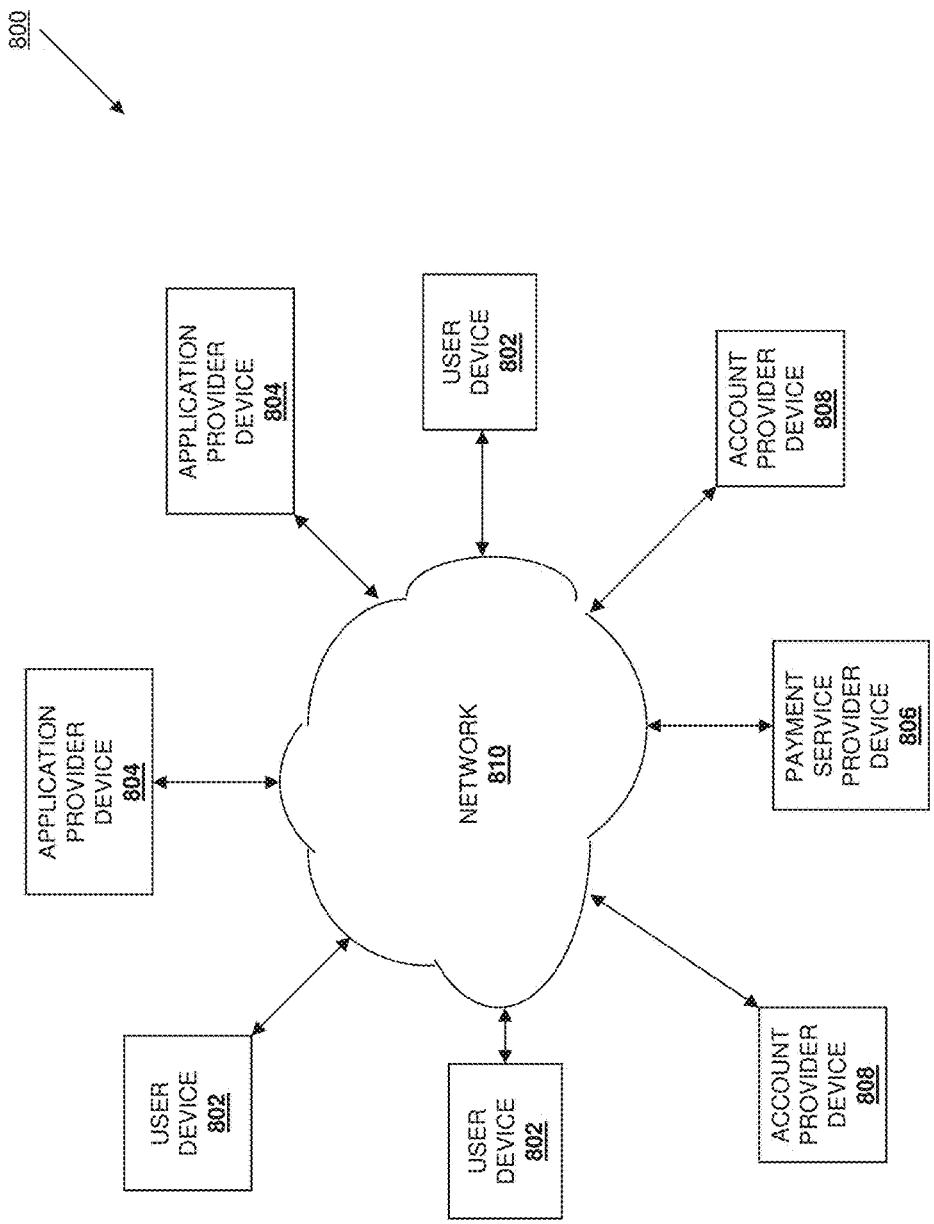
FIG. 8 is a schematic view illustrating an embodiment of a networked system.

Referring now to FIG. 8, an embodiment of a network-based system 800 for implementing one or more processes described herein is illustrated. As shown, network-based system 800 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 8 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 800 illustrated in FIG. 8 includes a plurality of user devices 802, a plurality of application provider devices 804, a payment service provider device 806, and a plurality of account provider devices 808 in communication over a network 810. Any of the user devices 802 may be the user device 200, discussed above. The application provider devices 804 may be the application provider devices discussed above and may be operated by the application providers discussed above. The payment service provider device 806 may be the payment service provider devices discussed above and may be operated by a payment service provider such as, for example, PayPal Inc. of San Jose, Calif. The account provider devices 808 may be the account provider devices discussed above and may be operated by the account providers discussed above such as, for example, credit card account providers, checking account providers, savings account providers, and a variety of other account providers known in the art.

The user devices 802, application provider devices 804, payment service provider device 806, and account provider devices 808 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 800, and/or accessible over the network 810.

The network 810 may be implemented as a single network or a combination of multiple networks. For example, in various embodiments, the network 810 may include the Internet and/or one or more intranets, landline networks, wireless networks, and/or other appropriate types of networks.

The user device 802 may be implemented using any appropriate combination of hardware and/or software configured for wired and/or wireless communication over network 810. For example, in one embodiment, the user device 802 may be implemented as a personal computer of a user in communication with the Internet. In other embodiments, the user device 802 may be a smart phone, personal digital assistant (PDA), laptop computer, and/or other types of computing devices.

The user device 802 may include one or more browser applications which may be used, for example, to provide a convenient interface to permit the user to browse information available over the network 810. For example, in one embodiment, the browser application may be implemented as a web browser configured to view information available over the Internet.

The user device 602 may also include one or more toolbar applications which may be used, for example, to provide user-side processing for performing desired tasks in response to operations selected by the user. In one embodiment, the toolbar application may display a user interface in connection with the browser application.

The user device 802 may further include other applications as may be desired in particular embodiments to provide desired features to the user device 802. In particular, the other applications may include a payment application for payments assisted by a payment service provider through the payment service provider device 806. The other applications may also include security applications for implementing user-side security features, programmatic user applications for interfacing with appropriate application programming interfaces (APIs) over the network 810, or other types of applications. Email and/or text applications may also be included, which allow the user to send and receive emails and/or text messages through the network 810. The user device 802 includes one or more user and/or device identifiers which may be implemented, for example, as operating system registry entries, cookies associated with the browser application, identifiers associated with hardware of the user device 802, or other appropriate identifiers, such as a phone number. In one embodiment, the user identifier may be used by the payment service provider device 806 and/or account provider device 808 to associate the user with a particular account as further described herein.

The application provider device 804 may be maintained, for example, by a conventional or on-line application provider, conventional or digital goods seller, individual seller, and/or application developer offering various products and/or services in exchange for payment to be received conventionally or over the network 810. In this regard, the application provider device 804 may include a database identifying available products and/or services (e.g., collectively referred to as items) which may be made available for viewing and purchase by the user.

The application provider device 804 also includes a checkout application which may be configured to facilitate the purchase by the payer of items. The checkout application may be configured to accept payment information from the user through the user device 802, the account provider through the account provider device 808, and/or from the payment service provider through the payment service provider device 806 over the network 810.

Figure 9:
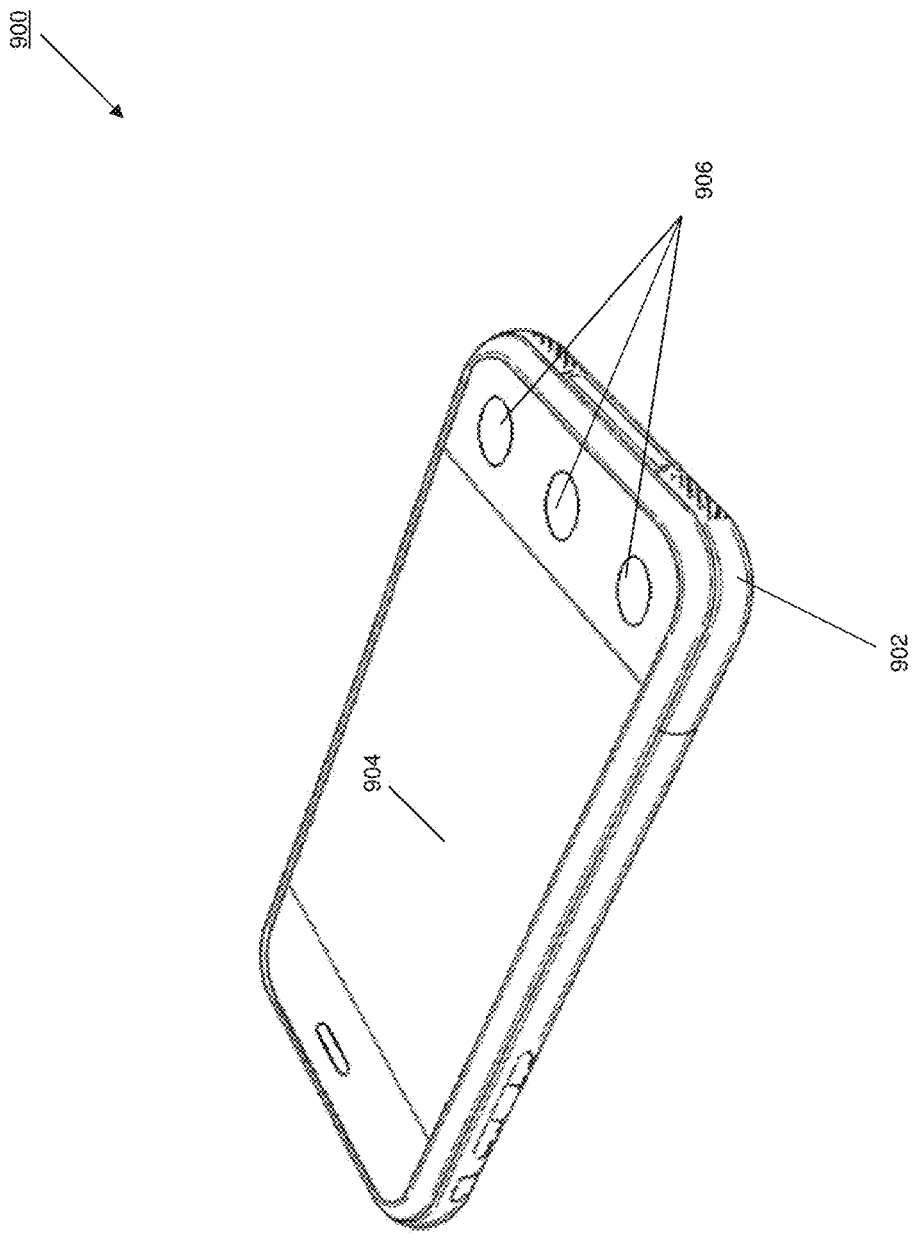
FIG. 9 is a perspective view illustrating an embodiment of a user device.

Referring now to FIG. 9, an embodiment of a user device 900 is illustrated. The user device 900 may be the user devices 200 and/or 802. The user device 900 includes a chassis 902 having a display device 904 and an input device including the display device 904 and a plurality of input buttons 906. One of skill in the art will recognize that the user device 900 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 10:
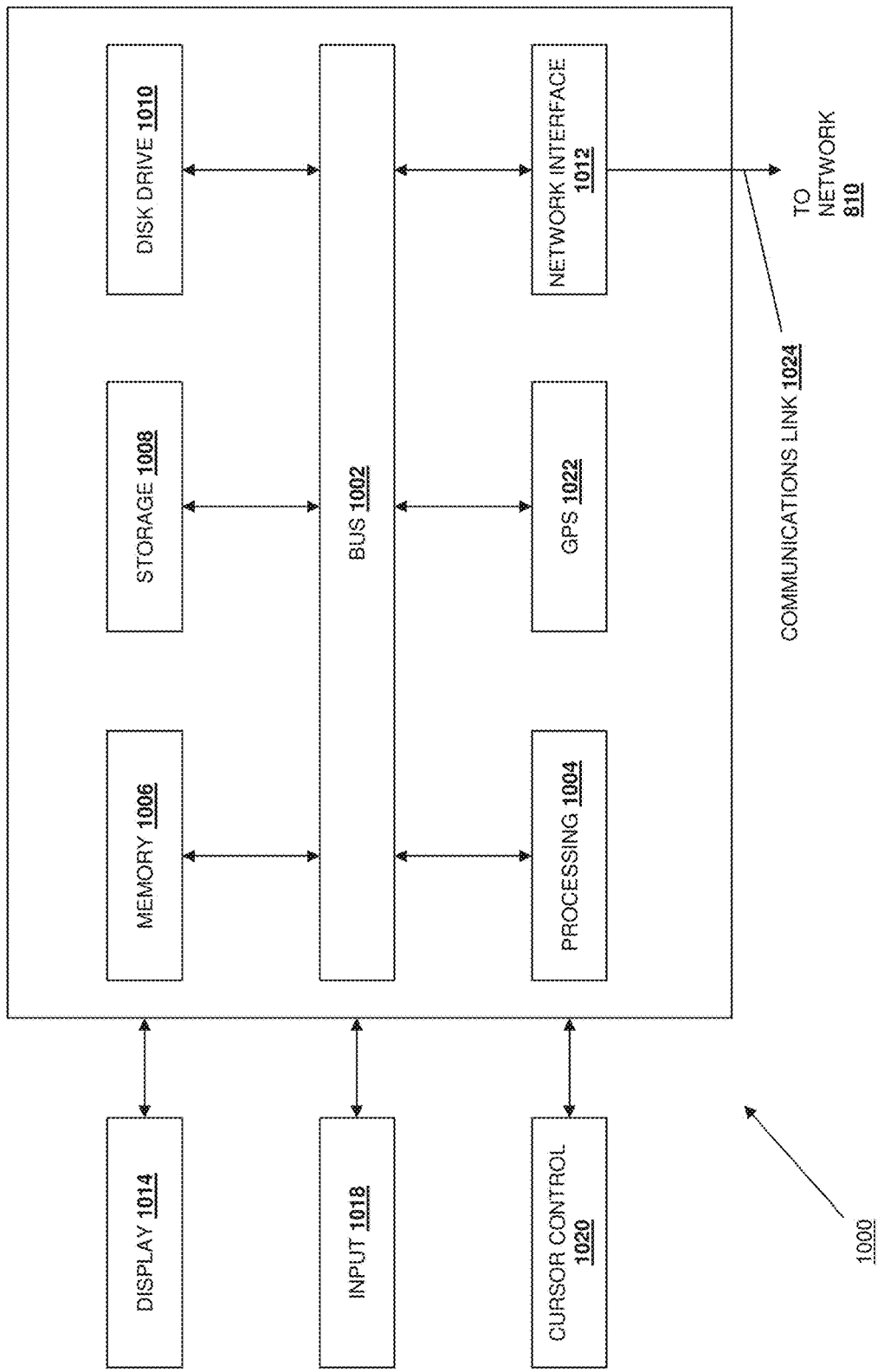
FIG. 10 is a schematic view illustrating an embodiment of a computer system.

Referring now to FIG. 10, an embodiment of a computer system 1000 suitable for implementing, for example, the user device 200, the user device 802, the user device 900, the application provider device 804, the payment service provider device 806, and/or the account provider device 808, is illustrated. It should be appreciated that other devices utilized by user, application providers, payment service providers, and account providers in the payment system discussed above may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), and/or a location determination component 1022 (e.g., a Global Positioning System (GPS) device as illustrated, a cell tower triangulation device, and/or a variety of other location determination devices known in the art.) In one implementation, the disk drive component 1010 may comprise a database having one or more disk drive components.

In accordance with embodiments of the present disclosure, the computer system 1000 performs specific operations by the processor 1004 executing one or more sequences of instructions contained in the memory component 1006, such as described herein with respect to the user device 200, 802, and 900, the application provider device(s) 804, the payment service provider device 806, and/or the account provider device(s) 808. Such instructions may be read into the system memory component 1006 from another computer readable medium, such as the static storage component 1008 or the disk drive component 1010. In other embodiments, hardwired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media.

In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 810 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Figure 11:
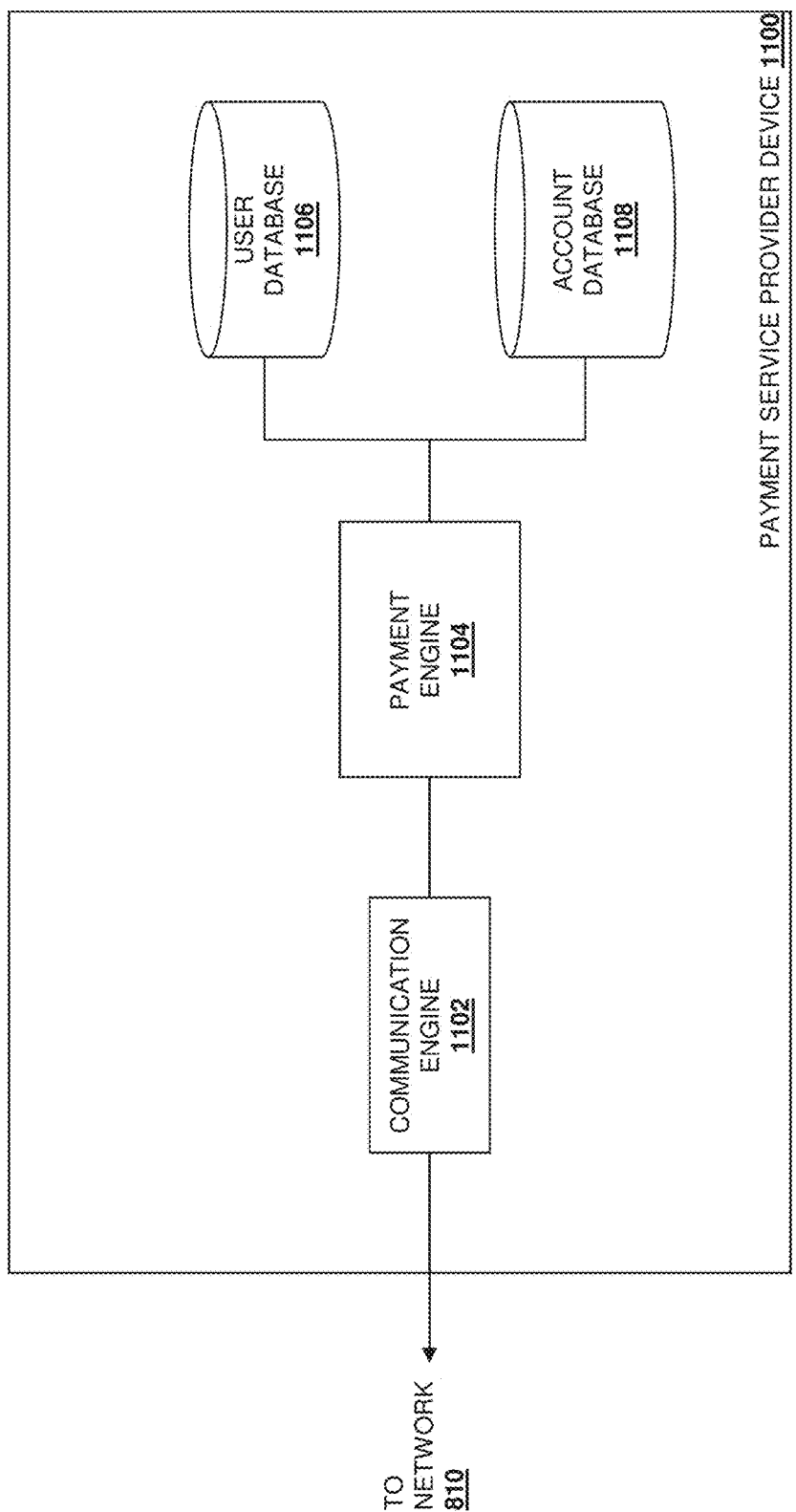
FIG. 11 is a schematic view illustrating an embodiment of a payment service provider device.

Referring now to FIG. 11, an embodiment of a payment service provider device 1100 is illustrated. In an embodiment, the device 1100 includes a communication engine 102 that is coupled to the network 810 and to payment engine 904 that is coupled to a user database 1106 and an account database 1108. The communication engine 1102 may be software or instructions stored on a computer-readable medium that allows the device 100 to send and receive information over the network 810. The payment engine 1104 may be software or instructions stored on a computer-readable medium that is operable to verify a user using the user database 1106, receive fund transfer instructions, transfer funds from a funding source to a payment account in the account database 1108, associate a payment account with an application in the account database 1108, receive requests for in-application purchases, determine whether a payment account has sufficient funds to satisfy an in-application purchase request using the account database 1108, deny an in-application purchase request, transfer funds to pay for an in-application payment request, record in-application purchases in the user database 1106, provide payment account reports, and perform any of the other functionality that is discussed above. While the databases 1106 and 1108 have been illustrated as located in the payment service provider device 1100, one of skill in the art will recognize that they may be connected to the payment engine 1104 through the network 810 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users and application providers; however, a user or consumer can pay, or otherwise interact with any type of recipient, including charities and individuals. The payment does not have to involve a purchase, but may be a loan, a charitable contribution, a gift, etc. Thus, application provider as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A multi-platform, in-application payment system, comprising:
    a non-transitory memory system; and
    one or more hardware processors coupled to the non-transitory memory and configured to execute instructions to cause the system to perform operations comprising:
        causing, in response to receiving fund transfer instructions through a network from a first user device, an amount of funds to be transferred from a funding source to a first user account;
        allocating a first subset of the amount of funds to a first user account budget that is associated with a first platform application provided by a first application platform, and a second subset of the amount of funds to a second user account budget that is associated with a second platform application provided by a second application platform that is different than the first application platform;

receiving, through the network via the first platform application provided on the first user device, a first platform application purchase instruction;

determining, in response to receiving the first platform application purchase instruction, that the first user account budget includes sufficient funds to satisfy the first platform application purchase instruction;

causing, in response to determining that the first user account budget includes sufficient funds to satisfy the first platform application purchase instruction, a first payment to be made using at least some of the first subset of the amount of funds allocated in the first user account to the first user account budget;

receiving, through the network via the second platform application provided on a second user device that is different than the first user device, a second platform application purchase instruction;

determining, in response to receiving the second platform application purchase instruction, that the second user account budget includes sufficient funds to satisfy the second platform application purchase instruction; and causing, in response to determining that the second user account budget includes sufficient funds to satisfy the second platform application purchase instruction, a second payment to be made using at least some of the second subset of the amount of funds allocated in the first user account to the second user account budget.

2. The system of claim 1, wherein the operations further comprise:

receiving, through the network from the first user device, a designation of the first subset of the amount of funds for the first user account budget and of the second subset of the amount of funds to the second user account budget.

3. The system of claim 1, wherein the operations further comprise:

providing, for display on the first user device, at least one first user account budget reporting screen that includes a first platform application indicator in association with the first payment and a second platform application indicator in association with the second payment.

4. The system of claim 3, wherein the first user account budget reporting screen includes a first payment amount that is associated with the first payment and a second payment amount that is associated with the second payment.

5. The system of claim 3, wherein the first user account budget reporting screen includes a first description associated with the first payment and a second description associated with the second payment.

6. The system of claim 1, wherein the causing the amount of funds to be transferred from the funding source to the first user account and the causing the second payment to be made using at least some of the second subset of the amount of funds include:

causing a predetermined amount of funds to be automatically transferring from the funding source to the first user account and automatically allocating the predetermined amount of funds to the second user account budget at a reoccurring predetermined time.

7. A method for providing multi-platform application payments, comprising:

receiving a fund transfer request through a network from a user device;

in response to the receiving, performing, by a payment service provider device, a fund transfer to transfer funds from a funding source to a user account;

designating, by the payment service provider device, a first fund amount of the funds for a primary user account budget that is associated with a first application platform and a second fund amount of the funds for a secondary user account budget that is associated with a second application platform that is different than the first application platform;

receiving, by the payment service provider device through the network via a first platform application provided on the first user device, a first application platform purchase instruction;

determining, by the payment service provider device in response to receiving the first application platform purchase instruction, that the primary user account budget includes sufficient funds to satisfy the first application platform purchase instruction;

causing, by the payment service provider device in response to determining that the primary user account budget includes sufficient funds to satisfy the first application platform purchase instruction, a first payment to be made using at least some of the first fund amount designated for the primary user account budget;

receiving, by the payment service provider device through the network via a second platform application provided on a second user device, a second application platform purchase instruction;

determining, by the payment service provider device in response to receiving the second application platform purchase instruction, that the secondary user account budget includes sufficient funds to satisfy the second application platform purchase instruction; and causing, by the payment service provider device in response to determining that the secondary user account budget includes sufficient funds to satisfy the second application platform purchase instruction, a second payment to be made using at least some of the second fund amount designated for the secondary user account budget.

8. The method of claim 7, further comprising:

associating, by the payment service provider device, the first payment with the primary user account budget in a database, and associating the second payment with the secondary user account budget in the database.

9. The method of claim 8, wherein the primary user account budget reporting screen includes a first payment amount and a first description that are associated with the first payment and a second payment amount and a second description that are associated with the second payment.

10. The method of claim 7, further comprising:

providing, by the payment service provider device for display on the first user device, at least one primary user account budget reporting screen that includes a first application platform indicator in association with the first payment and a second application platform indicator in association with the second payment.

11. The method of claim 7, further comprising:

receiving, by the payment service provider device through the network from the first user device, a designation of the first fund amount for the primary user account budget and of the second fund amount for the secondary user account budget.

12. The method of claim 7, wherein the causing the transfer of the funds from the funding source to the primary user account and designating the second fund amount to the secondary user account budget include automatically transferring a predetermined amount of funds from the funding source to the primary user account and automatically allocating the predetermined amount of funds to the secondary user account budget at a reoccurring predetermined time.

13. The method of claim 7, wherein the primary user account is an application-type budget payment account that is designated for making payments associated with applications provided on the first application platform.

14. A non-transitory machine-readable medium having stored thereon machine-readable instructions executable to cause a machine to perform operations comprising:

receiving, through a network from a first user device, fund transfer instructions;

transferring, in response to the fund transfer instructions, funds from a funding source to a user account that is associated with a primary account budget and a secondary account budget;

allocating a first fund amount of the funds to the primary account budget that is associated with a first platform application and to a second fund amount of the funds to the secondary account budget that is associated with a second platform application that is provided by a different application platform than the first platform application;

receiving, through the network via the first platform application provided on the first user device, a first platform application purchase instruction;

determining, in response to receiving the first platform application purchase instruction, that the primary user account budget includes sufficient funds to satisfy the first platform application purchase instruction;

causing, in response to determining that the primary user account budget includes sufficient funds to satisfy the first platform application purchase instruction, a first payment to be made using at least some of the first fund amount allocated to the primary user account budget;

receiving, through the network via the second platform application provided on a second user device, a second platform application purchase instruction;

determining in response to receiving the second platform application purchase instruction, that the secondary user account budget includes sufficient funds to satisfy the second platform application purchase instruction; and causing, in response to determining that the secondary user account budget includes sufficient funds to satisfy the second platform application purchase instruction, a second payment to be made using at least some of the second fund amount allocated to the secondary user account budget.

15. The non-transitory machine-readable medium of claim 14, wherein the operations further comprise:

associating the first payment with the primary user account budget in a database, and associating the second payment with the secondary user account budget in the database.

16. The non-transitory machine-readable medium of claim 14, wherein the operations further comprise:

displaying, on the first user device, at least one primary user account budget reporting screen that includes a first platform application indicator in association with the first payment and a second platform application indicator in association with the second payment.

17. The non-transitory machine-readable medium of claim 16, wherein the primary user account budget reporting screen includes a first payment amount that is associated with the first payment and a second payment amount that is associated with the second payment.

18. The non-transitory machine-readable medium of claim 16, wherein the primary user account budget reporting screen includes a first description associated with the first payment and a second description associated with the second payment.

19. The non-transitory machine-readable medium of claim 14, wherein the transferring the amount of funds from the funding source to the primary user account and allocating the second fund amount to the secondary user account budget include automatically transferring a predetermined amount of funds from the funding source to the primary user account and automatically allocating the predetermined amount of funds to the secondary user account budget at a reoccurring predetermined time.

20. The non-transitory machine-readable medium of claim 14, wherein the primary user account is an application-type budget payment account that is designated for making payments associated with applications that are the same type of applications as the first platform application.

* * * * *